Patented June 6, 1944

2,350,811

UNITED STATES PATENT OFFICE 2,350,811

PROCESS OF ARTIFICIAL DIGESTION OF ALBUMINOID AND FATTY SUBSTANCES

Maurice Percheron, Paris, France; vested in the Alien Property Custodian

No Drawing. Application March 17, 1939, Serial No. 262,567. In France March 22, 1938

6 Claims. (Cl. 99—14)

The present invention has for its object to reproduce, on an industrial scale and "in vitro," the process of the various transformations involved in the digestion of albuminoid and fatty substances "in vivo." In other words, first, to split the peptide chains which form the various proteins, secondly, to dissociate the lipidic and/or nitro-lipidic complexes, and finally, to bring these disintegrated substances into such chemical and physical condition that they can be readily assimilated by a living organism. The aforesaid disintegration is effected, according to this invention, by natural means, such as diastases and ferments.

In order to obtain a suitable artificial digestion according to the present invention, it is possible to proceed as follows:

*First operation.*—Reduce the material to be digested, to pulp form. If the albuminoid and/or fatty substances to be digested contain diastases or ferments, it is unnecessary to add these from external sources (and autolysis will take place); otherwise, the requisite diastases and/or ferments are added (and proteolysis will take place). If the diastases that are used for the digestion come, for example, from liver, stomach or intestinal secretion glands, said glands may be added to the mass to be treated, but only after they have been very finely ground.

*Second operation.*—There is then added to the resultant mass means for protecting the substances undergoing the artificial digestion from undesired bacterial actions and this means should, according to this invention, include among other things a solution of magnesium polysulfide in admixture with an agent having an oxidizing action under the reaction conditions, a phenylamino compound and a member of the group consisting of chloroform and its homologs. More specifically, there may be added to the resultant mass, prepared during the first operation, a mixture of chloroform, dinitrophenol and betapinene and a solution of magnesium polysulfide in a mixture of equal parts of acetone, isopropyl alcohol and phenylhydrazine hydrate.

It is possible to replace the chloroform (or the dinitrophenol) and the pinene by other substances having a similar action under the conditions of the present invention. Thus, the chloroform may be replaced by nitromethane, the betapinene by camphene, and the dinitrophenol by diphenylamino-sulfone or metaphenylenediamine.

The use of the above mentioned substances does not prevent the action of conventional metallic catalytic agents, which may be used in order to accelerate the artificial digestion.

*Third operation.*—A very thorough stirring by means of appropriate apparatus is effected in order to mix, first, the above mentioned solution of polysulphide of magnesium, and then the chloroform-pinene-dinitrophenol mixture. The mass thus treated can be kept and stored indefinitely. The present invention therefore provides a means for protecting from bacterial actions and in particular from putrefaction, all perishable materials which can previously withstand comminution.

*Fourth operation.*—If it is desired to keep the mass thus treated under certain conditions, it may be necessary to protect it from the action of aerobic bacteria, mildew, spores, etc. which might be capable of developing and of producing secondary fermentations. Protection therefrom is obtained by covering the mass stored in a tank with a fine layer of oil in which p-hydroxybenzoic acid has been dissolved (in the hot state) to form a $1/2000$ solution. By carefully mixing a large quantity of this oily solution with the mass to be treated the oxidation of the unsaturated fatty acid lipides will be prevented, at any rate in the cold state and for a limited time.

*Fifth operation.*—Before placing the mass to be digested in the maturation tanks (hereinafter mentioned), it is necessary to bring the mass prepared as above described to the suitable pH for starting the diastatic reactions. This pH varies of course according to the material: fish, meat of herbivorous animals, ovalbumin, flesh or organs of carnivorous animals and even leguminous materials. But the mass must always be brought to a pH which is lower than 7 and it is preferable to obtain a slightly acid mass.

This acidifying operation is effected either at the same time as the stirring of the mass with the above mentioned protecting substances (third operation), in the case in which the mass is subjected to an immediate digestion, or in the case of storing after the aforesaid fourth operation, only at the time when the mass is placed in the maturation tank, in order to prevent the starting of slow lysis, in the cold state, of the mass during storage. In this latter case, a second mixing of the mass is effected with the acid added.

*Sixth operation.*—The mass of proteins and diastases thus acidified is then placed in a maturation tank in which digestion takes place. For this purpose, the mass is raised to such a temperature that the nitrogenous disintegration of the proteins takes place as quickly as possible, but the temperature must nevertheless be sufficiently low to prevent coagulation of the free albumins and destruction of the diastases or ferments employed. The temperature elevation should be effected quickly: it is therefore necessary to act on a divided mass and, if necessary, to stir continuously in order to avoid local overheating and the formation of crust.

During this digestion the pH falls gradually and spontaneously to 6.4, then rises after a time of its own accord to about 6.8. When it reaches this approximate value and stays there, the mass is buffered with soda until the pH is obtained (isoelectric point of ionic equilibrium). The basic function of the amino-acids (which are amphoteric) will thus act freely and salts of said amino-acids will thus form, for example histidine sulphate or sodium histidinate.

*Seventh operation.*—The digestion is stopped when the pH has returned of its own accord to pH 6.8 and stays so for twenty-four hours. The total duration of digestion varies according to the nature of the substances to be treated, the temperature, and the nature and the importance of the diastases.

*Eighth operation.*—When the digestion is completed, the initial material is in the form of a liquid with a sediment containing the undigested materials. The liquid part is formed of an aqueous solution of polypeptides, amino-acids (or their salts), free lipides, peroxidized lipides in suspension and saponified materials. The sediment is first of all separated from the solution by filtration, centrifugation, etc., and then the various substances of the solution are separated from each other by decantation, defecation with tannin and with lime, centrifugation, filtration and ultracentrifugation. These mechanical separating processes may be effected in the hot or the cold state, according to the substances treated, using their properties of solubility above a given temperature.

There is therefore obtained:

(a) Undigestible substances: cartilage, conjunctive substances, bones, fish-bones, scales, etc., according to the materials treated.

(b) Nitrogenous products in aqueous solution; these products no longer exhibit any trace of the temporary protecting agents. It is therefore necessary to concentrate this solution, since otherwise various bacterial actions may occur. If it is desired to keep this liquid, 50% of its constitutive water is removed, whereby, as is known, it can be kept indefinitely. The removal of this water may be effected either in vacuo, or by exposing in a thin layer, or by cryogeny or by adsorption. Broadly speaking any method may be used which does not cause decarboxylation or deamination but which removes harmful or useless ammoniacal products. This concentration may be continued to a further extent, for example until a paste or even a dry product is obtained. These amino-acids or their salts in this case appear in a crystalline form;

(c) Fatty substances which remain on the filter or are separated by decantation or centrifugation. These substances are in reality formed by a mixture of undigested substances, chromoproteins, peroxides of fatty acids, various lipides, salts of various phosphoric acids, amino-alcohols, lecithins, and higher alcohols. These substances frequently include chlorinated radicals or nitrile radicals.

*Ninth operation.*—The said fatty substances may be recovered and subjected to re-digestion in order finally to eliminate the undigested materials which were not affected by the digestion during the first maturation operation (sixth operation), and the various products obtained are treated as stated above in the seventh and eighth operations. They are preferably exposed in a thin layer either to vacuum or to heat which is not prejudicial to the organoleptic diastases, so as to eliminate the volatile chlorinated residues.

From these fresh exhausted fatty substances, the excess of free lipides is separated by decantation, pressure or centrifugation. Then the residual mass is treated with suitable solvents in such a manner as only to carry away the fatty substances which were refractory to this separation. The products, other than the lipides, which might be dissolved in the solvents, are then chemically precipitated. The heterogeneous mass of phosphoaminated substances which is then obtained can be readily separated, if necessary, by the usual washing, fractionated solubility and chemical precipitation means.

Thus, by operating as stated above, a slow and complete artificial digestion is obtained, which in any case is certainly carried much farther than that which living organisms would have effected naturally. The complex protein molecules have been extremely subdivided (a primary object of the invention), and a part of the lipides has also been converted into elementary substances. Except for the undigestible substances, the resultant products are readily assimilable by a living organism and possess high nutritive and therapeutical value. It may also be noted that the final products are stable although they contain neither sodium chloride nor any other preservative.

I claim:

1. A process for the production of assimilable substances by the artificial digestion of albuminoid and fatty substances, comprising first comminuting the latter and then subjecting them to the action of a proteolytic enzyme in the presence of means for protecting the substances undergoing the artificial digestion from undesired bacterial actions, said means including a solution of magnesium polysulfide in admixture with a substance having an oxidizing action under the reaction conditions, a phenylamino compound and a member of the group consisting of chloroform and its homologs.

2. A process for the production of assimilable substances by the artificial digestion of albuminoid and fatty substances, comprising first comminuting the latter and then subjecting them to the action of a proteolytic enzyme in the presence of means for protecting the substances undergoing the artificial digestion from undesired bacterial actions, said means including a solution of magnesium polysulfide in a mixture containing phenylhydrazine hydrate and chloroform.

3. A process for the production of assimilable substances by the artificial digestion of albuminoid and fatty substances, comprising first comminuting the latter and then subjecting them to the action of a proteolytic enzyme in the presence of means for protecting the substances undergoing the artificial digestion from undesired bacterial actions, said means including a solution of magnesium polysulfide in a mixture of equal parts of acetone, isopropyl alcohol and phenylhydrazine hydrate, and a mixture of chloroform, dinitrophenol and betapinene.

4. A process for the production of assimilable substances by the artificial digestion of albuminoid and fatty substances, comprising first comminuting the latter and then subjecting them to the action of a proteolytic enzyme in the presence of means for protecting the substances undergoing the artificial digestion from undesired bacterial actions, said means including a solution of magnesuim polysulfide in a mixture containing phenylhydrazine hydrate and chloroform, the pH of the reaction mixture being less than 7.

5. A process for the production of assimilable substances by the artificial digestion of albuminoid and fatty substances, comprising first comminuting the latter and then subjecting them to the action of a proteolytic enzyme in the presence of means for protecting the substances undergoing the artificial digestion from undesired bacterial actions, said means including a solution of magnesium polysulfide in a mixture containing phenylhydrazine hydrate and chloroform, the reaction medium containing a solution in oil of p-hydroxybenzoic acid in a concentration of 1 part of the latter to 2000 parts of oil, the pH of the reaction medium being less than 7.

6. A process for the production of assimilable substances by the artificial digestion of albuminoid and fatty substances, comprising first comminuting the latter and then subjecting them to the action of a proteolytic enzyme in the presence of means for protecting the substances undergoing the artificial digestion from undesired bacterial actions, said means including a solution of magnesium polysulfide in a mixture containing phenylhydrazine hydrate and chloroform, the pH of the reaction medium being less than 7, separating the resultant liquid reaction products from sediment contained therein and dehydrating the liquid products until at least 50% of their water content has been removed.

MAURICE PERCHERON.